(12) United States Patent
Chiu et al.

(10) Patent No.: US 7,283,733 B2
(45) Date of Patent: Oct. 16, 2007

(54) SYSTEM AND METHOD FOR REGULATING A LOAD BY UTILIZING PULSE WIDTH MODULATION

(75) Inventors: Chih-Kai Chiu, Hsichih (TW); Chien-Hui Chen, Hsichih (TW)

(73) Assignee: AOPEN Incorporated, Taipei (TW)

( * ) Notice: Subject to any disclaimer, the term of this patent is extended or adjusted under 35 U.S.C. 154(b) by 0 days.

(21) Appl. No.: 11/280,216

(22) Filed: Nov. 17, 2005

(65) Prior Publication Data

US 2006/0127066 A1   Jun. 15, 2006

(30) Foreign Application Priority Data

Dec. 10, 2004   (TW) ............... 93138344 A

(51) Int. Cl.
*H02P 7/06*   (2006.01)
(52) U.S. Cl. .................. 388/804; 388/803; 361/688; 361/687
(58) Field of Classification Search ............... 388/803, 388/800, 816, 804; 361/688, 687
See application file for complete search history.

(56) References Cited

U.S. PATENT DOCUMENTS

| | | | | |
|---|---|---|---|---|
| 5,916,313 A | * | 6/1999 | Brown | 713/300 |
| 6,714,891 B2 | * | 3/2004 | Dendinger | 702/132 |
| 6,949,823 B2 | * | 9/2005 | Schott et al. | 257/707 |
| 6,963,175 B2 | * | 11/2005 | Archenhold et al. | 315/291 |
| 2005/0127881 A1 | * | 6/2005 | Sase et al. | 323/225 |
| 2005/0174737 A1 | * | 8/2005 | Meir | 361/697 |
| 2006/0013571 A1 | * | 1/2006 | Squibb | 388/804 |

* cited by examiner

*Primary Examiner*—Rita Leykin
(74) *Attorney, Agent, or Firm*—Birch, Stewart, Kolasch & Birch, LLP

(57) ABSTRACT

The invention is directed to a system and method for regulating a load (such as a CPU). A pulse-width-modulation (PWM) regulator calculates the duty cycle of the control pulse from a PWM controller, and then compares the duty cycle to a predetermined threshold. Thereafter, the PWM regulator regulates working conditions, such as clock frequency, supplied voltage, or fan spin speed, based on the above comparison.

20 Claims, 8 Drawing Sheets

SYSTEM AND METHOD FOR REGULATING A LOAD BY UTILIZING PULSE WIDTH MODULATION

BACKGROUND OF THE INVENTION

1. Field of the Invention

The present invention generally relates to load regulation, and more particularly to load regulation by using pulse width modulation (PWM).

2. Description of the Prior Art

The detection of current plays an important role in electronic circuits, especially in power supply circuits. The power supply circuit provides the electronic circuit with needed current in a manner similar to that the human heart continuously provides the body with blood. As high blood pressure is harmful to health and thus precisely measuring the blood pressure is necessary, likewise precisely and instantaneously detecting the current is vital to the controllability of the electronic circuits. The current is conventionally detected by measuring the voltage drop across a resistor of known low resistance according to Ohm's law. However, this scheme has some disadvantages. Firstly, the accuracy of the current detection would be probably affected by the inaccuracy of the resistor itself, and by the environmental factors, such as temperature variation. Secondly, the resistor wastefully consumes power and generates heat, especially when the current becomes large.

The detection of the load current in a computer motherboard is conventionally accomplished by using a temperature sensor such as a thermistor, whose resistance varies according to the surface temperature of the load under detect, such as a central processing unit (CPU). The thermistor is then utilized to control a fan for dissipating the heat generated from the load. Unfortunately, the thermistor usually responds slowly, and therefore a real-time monitoring and controlling the system becomes difficult. FIG. 1 shows the relationship between the rotational (or spin) speed of the fan and the detected CPU temperature. The fan rotates faster when high temperature is detected, and conversely, the fan rotates slower when low temperature is detected. Another conventional way of detecting the load current is performed by an indirect and software manner. Specifically, a Windows application program interface (API) is used to read the utility rate of the CPU. A high utility rate indicates high load current, and conversely, a low utility rate indicates low load current. The detection by using such API possesses drawbacks existing in general software programs in that the operations sometimes cause delay, hang, or even crash, not to say such API is not supported by every system.

For overcoming the disadvantages mentioned above, a need has arisen to propose a system and method for effectively and spontaneously monitoring and adjusting the load of an electronic circuit.

SUMMARY OF THE INVENTION

In view of the foregoing, it is an object of the present invention to provide a system and method for spontaneously monitoring the load of an electronic circuit.

It is another object of the present invention to provide the system and method for detecting the variation of the load current, which is independent on the operating system, thereby preventing the instability situations.

It is a further object of the present invention to dynamically and effectively adjust the working frequency and the supplied voltage of the load.

A further object of the present invention is to efficiently control the dissipation of the heat generated from the load of an electronic circuit.

According to the object, the present invention provides a system and method for regulating a load (such as a CPU). A pulse-width-modulation (PWM) regulator calculates the duty cycle of the control pulse from a PWM controller, and then compares the duty cycle to a predetermined threshold. Thereafter, the PWM regulator regulates working conditions, such as clock frequency, supplied voltage, or fan spin speed, based on the above comparison. In one embodiment of the present invention, the clock frequency, the supplied voltage, or the fan spin speed is switched between two modes according to whether the duty cycle is greater than the threshold.

DETAILED DESCRIPTION OF THE INVENTION

Figure 2:
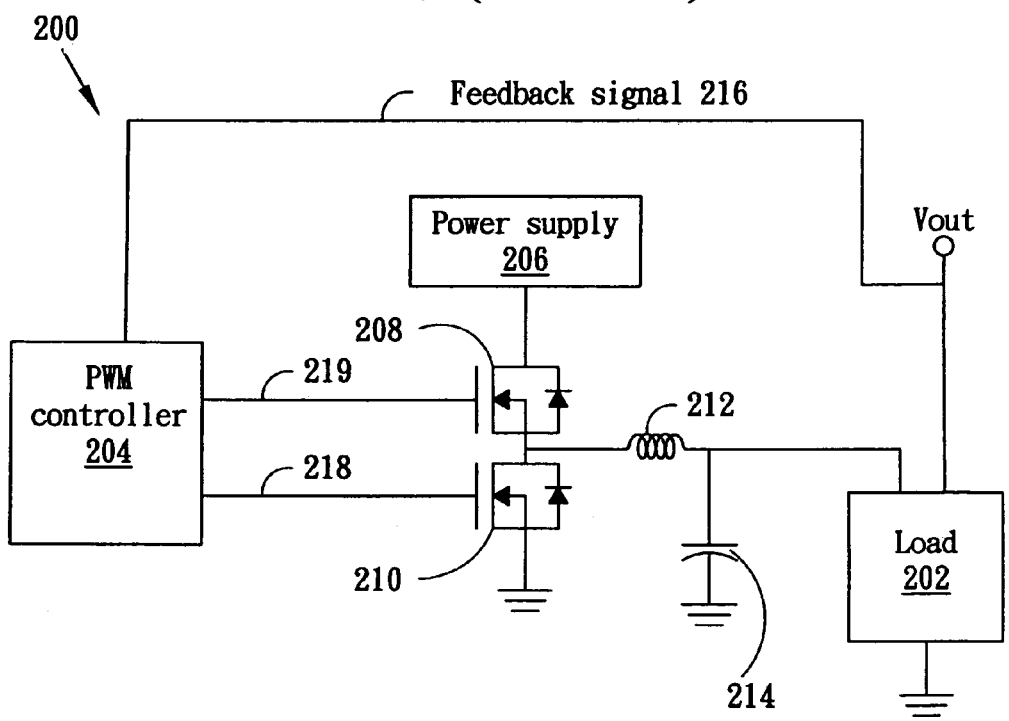
FIG. 2 shows a pulse-width-modulation (PWM) switching regulating circuit according to the present invention.
Figure 3:
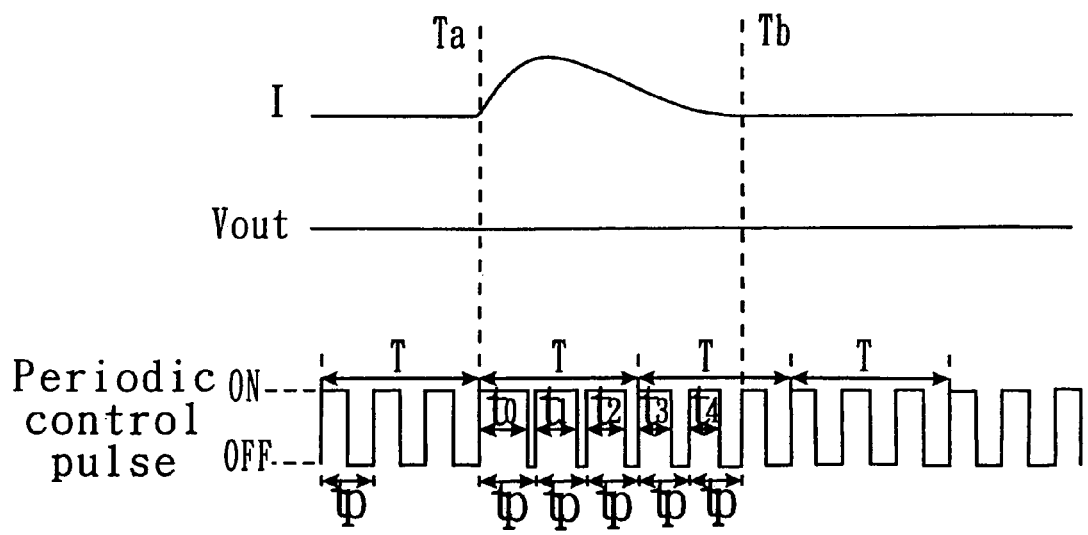
FIG. 3 shows the operating waveform of the PWM controller of FIG. 2.

FIG. 2. shows a pulse-width-modulation (PWM) switching regulating circuit 200 according to the present invention. The regulating circuit 200 includes a load 202 (such as an electronic device, a controller chip, a server, or a CPU), a PWM controller 204, a power supply 206, a high-side metal oxide semiconductor (MOS) transistor 208, a low-side MOS transistor 210, and a filter made of an inductor 212 and a capacitor 214. Further, the output voltage $V_{out}$ of the load 202 is fed back as a feedback signal 216 to the PWM controller 204. The PWM controller 204 is utilized to control the output voltage $V_{out}$ to be within a regulated and working range. FIG. 3 shows the operating waveform of the PWM controller 204 of FIG. 2. Assuming that the load current I starts to increase at time $T_a$, the corresponding voltage across the load 202 will drop accordingly. In order to keep the output voltage $V_{out}$ as stable as possible as shown in the figure, the PWM controller 204 thus increases the duty cycle (or duty ratio) of the periodic control pulses 218 and 219, which periodically turn ON and OFF the high-side transistor 208 and the lows-side transistor 210, and therefore input more voltage to the load 202. While approaching time $T_b$, the PWM controller 204 deceases the duty cycle of the periodic control pulses 218 and 219 to let less voltage transferring to the load 202, thereby keeping the output voltage $V_{out}$ stable as shown. The present invention makes use of the duty cycle variation from the PWM controller 204 to continuously and spontaneously detect the load current, and will be specifically described in the following.

Figure 4:
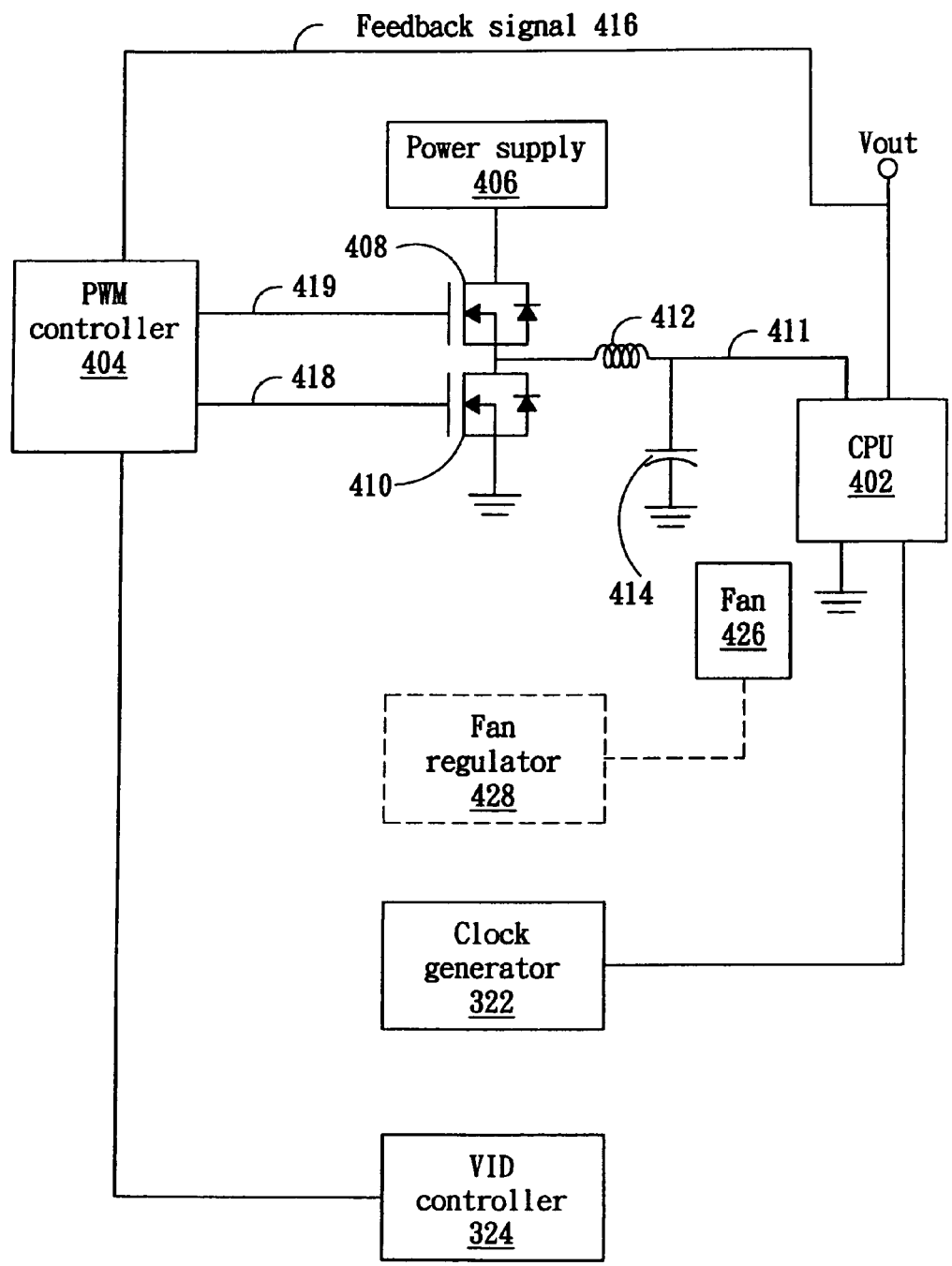
FIG. 4 illustrates a PWM switching regulating circuit according to one embodiment of the present invention.

FIG. 4 illustrates a PWM switching regulating circuit according to one embodiment of the present invention. A fan 426 is used to dissipate the heat generated from a load (e.g., a CPU 402 in this embodiment), whose clock input is provided by a clock generator 322. A power supply 406 provides the CPU 402 with power or voltage. A PWM controller 404 receives a feedback signal 416 from the output voltage $V_{out}$ of the CPU 402, and generates a first periodic control pulse 418 and a second periodic control pulse 419 to control the switch made of a low-side MOS transistor 410 and high-side MOS transistor 408. A filter made of an inductor 412 and a capacitor 414 filters to remove unwanted high-frequency fluctuations of the supplied voltage 411, which is supplied from the power supply 406 and is provided for the CPU 402. A voltage identification (VID) controller 324 provides stable voltage level corresponding to a set of voltage identification codes for the PWM controller 404 to controllably regulate the supplied voltage for the CPU 402. The variation of the periodic control pulse 418 or 419 is monitored in the present invention to recognize the high load current indicative of high CPU utility rate or the low load current indicative of low CPU utility rate. Based on the recognition, the clock generator 322, the VID controller 324, and the fan regulator 428 are properly adjusted, such that the clock frequency, the supplied voltage, and the rotational speed of the fan 426 could be optimally and effectively regulated.

As discussed above, the duty cycle of the periodic control pulse 418 or 419 increases while the load current becomes large, and conversely, the duty cycle decreases while the load current becomes small. Referring back to FIG. 3, the duty cycle R is defined as the ratio of the ON time $t_0$ to the period $t_p$ (i.e., $t_0/t_p$) at time $T_a$. A duty cycle R is then compared to a predetermined threshold C (for example, 0.6). If the duty cycle R is greater than the threshold C, it is then determined that the present load current is now increasing, which indicates that the CPU 402 is under a high utility rate. In order to increase processing capability of the CPU 402, the clock frequency of the clock generator 322 is increased, and the voltage level from the VID controller 324 is also increased. The adjusting extent of the frequency and the voltage level could be determined, for example, according to the difference between the duty cycle R and the threshold C.

The calculation of the duty cycle R and the comparison of the R to the threshold C is usually performed in the following way. Practically, in calculating the duty cycle R, a few (for example, three) consecutive periods $t_p$ are counted and averaged, instead of treating individual period $t_p$ which usually results in instability of the system. During the counting period T, the individual duty cycle values Rs are averaged. For example, three periods $t_p$ are obtained in one counting period T in FIG. 3, and the average duty cycle R after time $T_a$ is:

$$R=(t_0+t_1+t_2)/T$$

where T is equal to $3*t_p$

Figure 5:
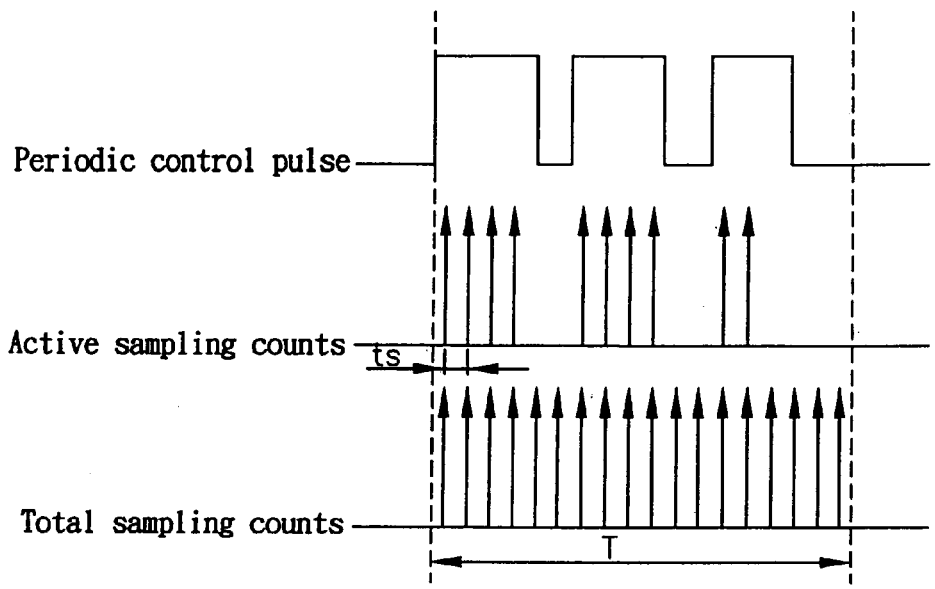
FIG. 5 illustrates a practical implementation of obtaining the average duty cycle.

FIG. 5 illustrates a practical implementation of obtaining the average duty cycle. The periodic control pulse is sampled every sampling time $t_s$, and the samples under the ON (active) time are counted. The average duty cycle R is then:

$$R=\text{active sampling counts/total sampling counts}$$

Figure 6:
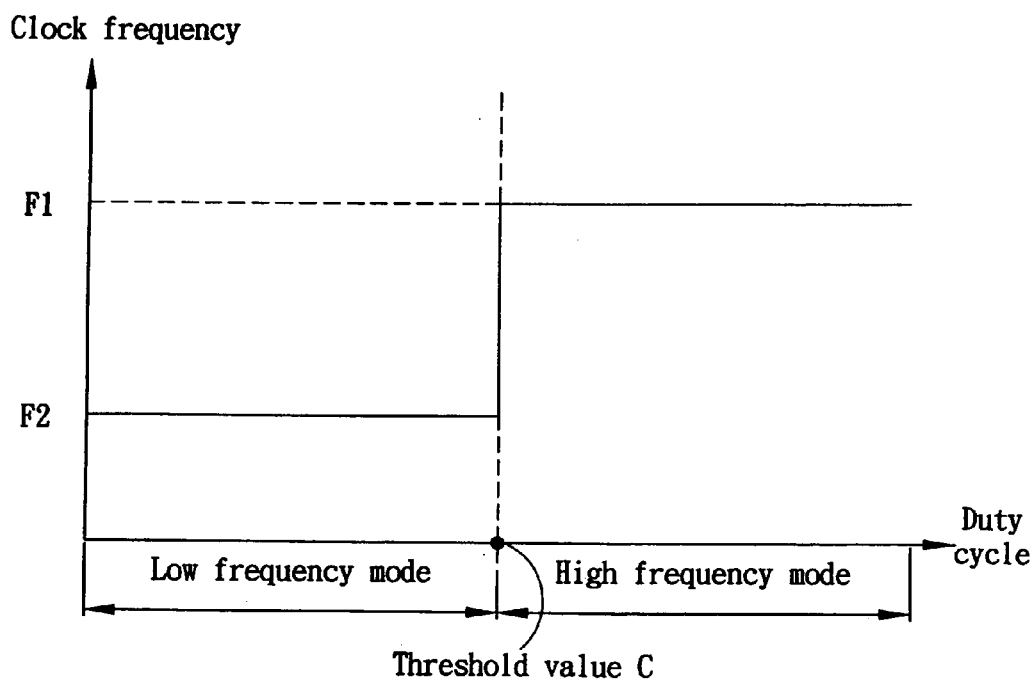
FIG. 6 and FIG. 7 show a two-level control of the clock frequency and the supplied voltage, respectively, according to the embodiment of the present invention.
Figure 7:
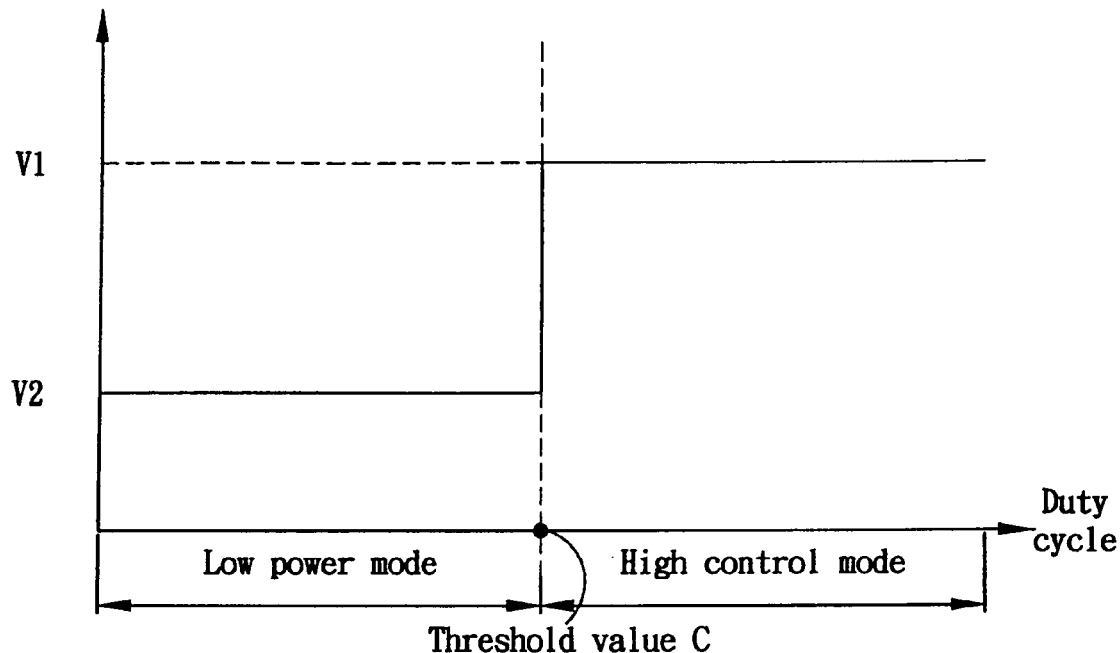

After the (average) duty cycle R is obtained, the duty cycle is then compared to a predetermined threshold C. Instead of adjusting the clock frequency or the supplied voltage linearly according to the difference of the duty cycle and the threshold, FIG. 6 and FIG. 7 show a two-level control of the clock frequency and the supplied voltage, respectively. Referring to FIG. 6, the clock frequency of the clock generator 322 is switched to a high frequency mode, which provides a high frequency F1 to the CPU 402, when the duty cycle is greater than the threshold C. Conversely, the clock frequency of the clock generator 322 is switched to a low frequency mode, which provides a low frequency F2 to the CPU 402, when the duty cycle is less than the threshold C. Similarly, as shown in FIG. 7, the CPU 402 is maintained at a high power mode with a high supplied voltage V1, when the duty cycle is greater than the threshold C. Conversely, the CPU 402 is maintained at a low power mode with a low supplied voltage V2, when the duty cycle is less than the threshold C.

Figure 8:
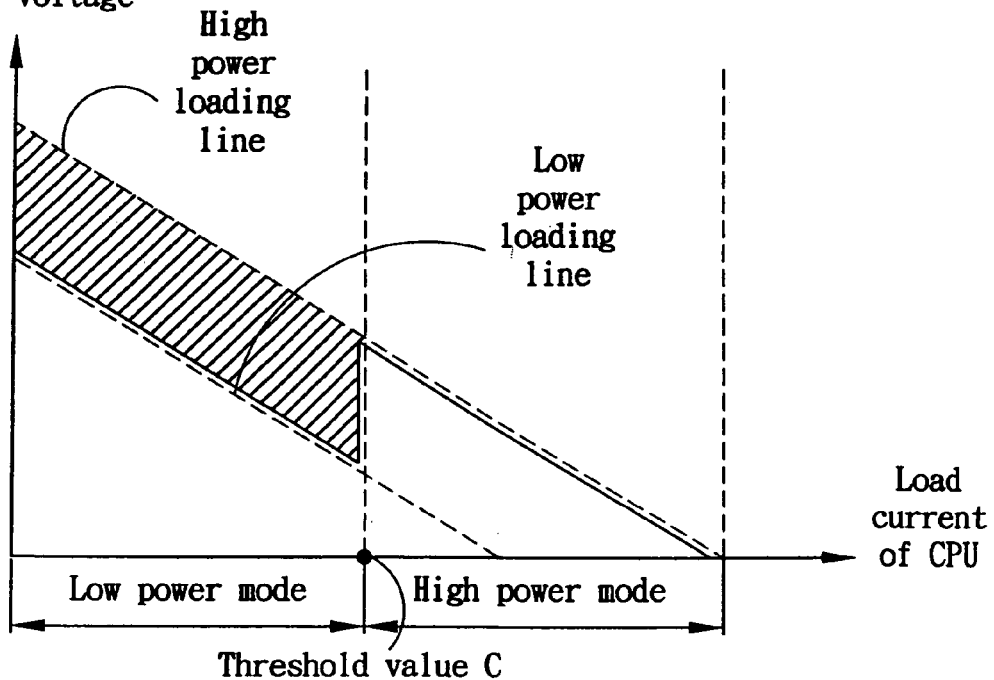
FIG. 8 shows the loading line of the CPU under the high/low power mode.

FIG. 8 shows the loading line of the CPU 402 under the high/low power mode, where the horizontal axis represents the load current of the CPU 402, and the vertical axis represents the supplied voltage of the CPU 402. The straight line designated as the high power loading line represents the conventional CPU whose current is inversely and linearly proportional to its supplied voltage. After adapting the present invention, the loading line becomes the saw-tooth line designated as the low power loading line, which switches at the threshold value C. As is evidently shown, a substantial reduction in power consumption is obtained as shown in the area enclosing oblique lines. For a commercial clock generator, it usually includes a control pin that can be controllably adapted to the present invention for switching between two different clock frequencies. It is appreciated that multi-level (i.e., more than two levels) control of the clock frequency or the supplied voltage is also adaptable.

Figure 1:
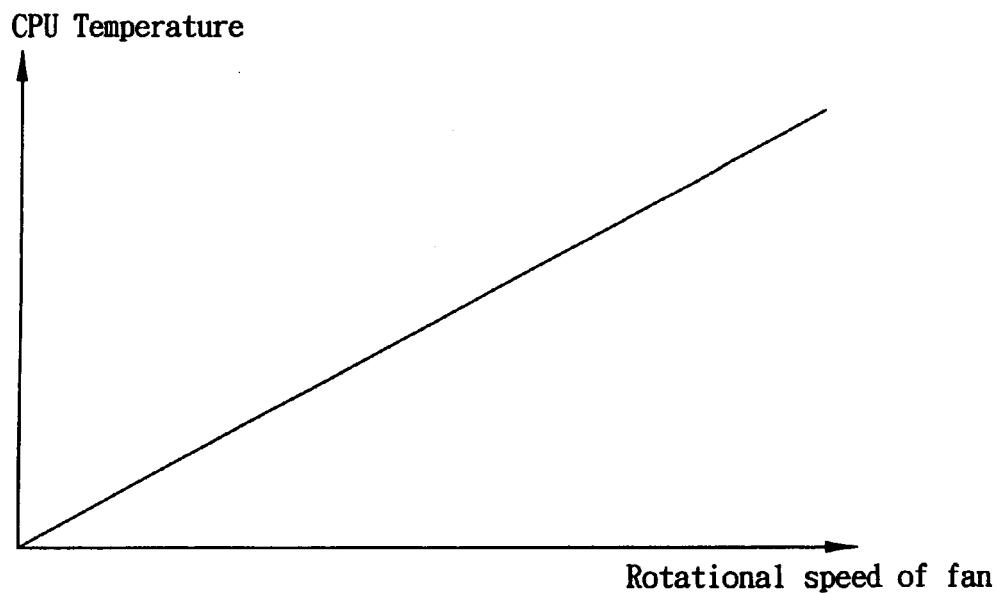
FIG. 1 shows the relationship between the rotational speed of the fan and the detected CPU temperature in a conventional system.
Figure 9:
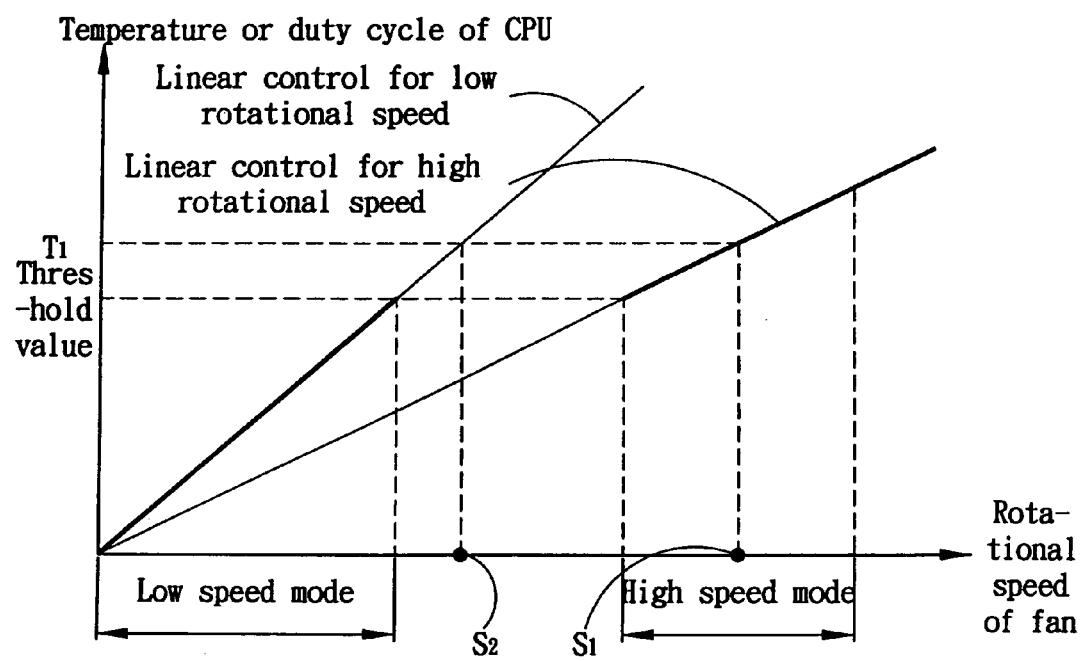
FIG. 9 shows a two-level control of the rotational speed of the fan according to the embodiment of the present invention.

A fan 426 is also used in the system of FIG. 4 to dissipate the heat generated from the CPU 402. A thermistor (not shown) triggers to increase the rotational speed of the fan 426 whenever the temperature of the CPU 402 goes up, and conversely, the thermistor decreases the rotational speed of the fan 426 whenever the temperature of the CPU 402 goes down. According to the present invention, the rotational speed of the fan 426 is controlled by a fan regulator 428 according to the comparing result of the duty cycle to the threshold C. If the duty cycle is greater than the threshold C, it is then determined that the CPU 402 is under a high utility rate and will generate more heat. Accordingly, the fan regulator 428 switches the fan 426 to a high speed mode when the duty cycle is greater than the threshold C, and conversely the fan regulator 428 switches the fan 426 to a low speed mode when the duty cycle is less than the threshold C as shown in FIG. 9. As shown in the figure, in either speed mode, the fan 426 is controlled in a linear manner, that is, the rotational speed of the fan 426 varies proportionally to the temperature detected by the thermistor. Compared to FIG. 1, the present invention adapts a two-level control, in which a temperature (such as $T_1$) corresponds to two different rotational speeds (such $S_1$ and $S_2$), depending on which speed mode the CPU 402 now belongs to. Accordingly, the fan 426 rotates faster under a high CPU utility rate to prevent burning out the CPU 402, and conversely the fan 426 rotates slower under a low CPU utility rate to conserve power and keep the fan quiet. It is appreciated that multi-level (i.e., more than two levels) control of the fan is also adaptable. It is further appreciated that the fan could be nonlinearly controlled in a manner similar to that shown in FIG. 6 or FIG. 7, such that the thermistor could be eliminated and the response becomes faster.

Figure 10:
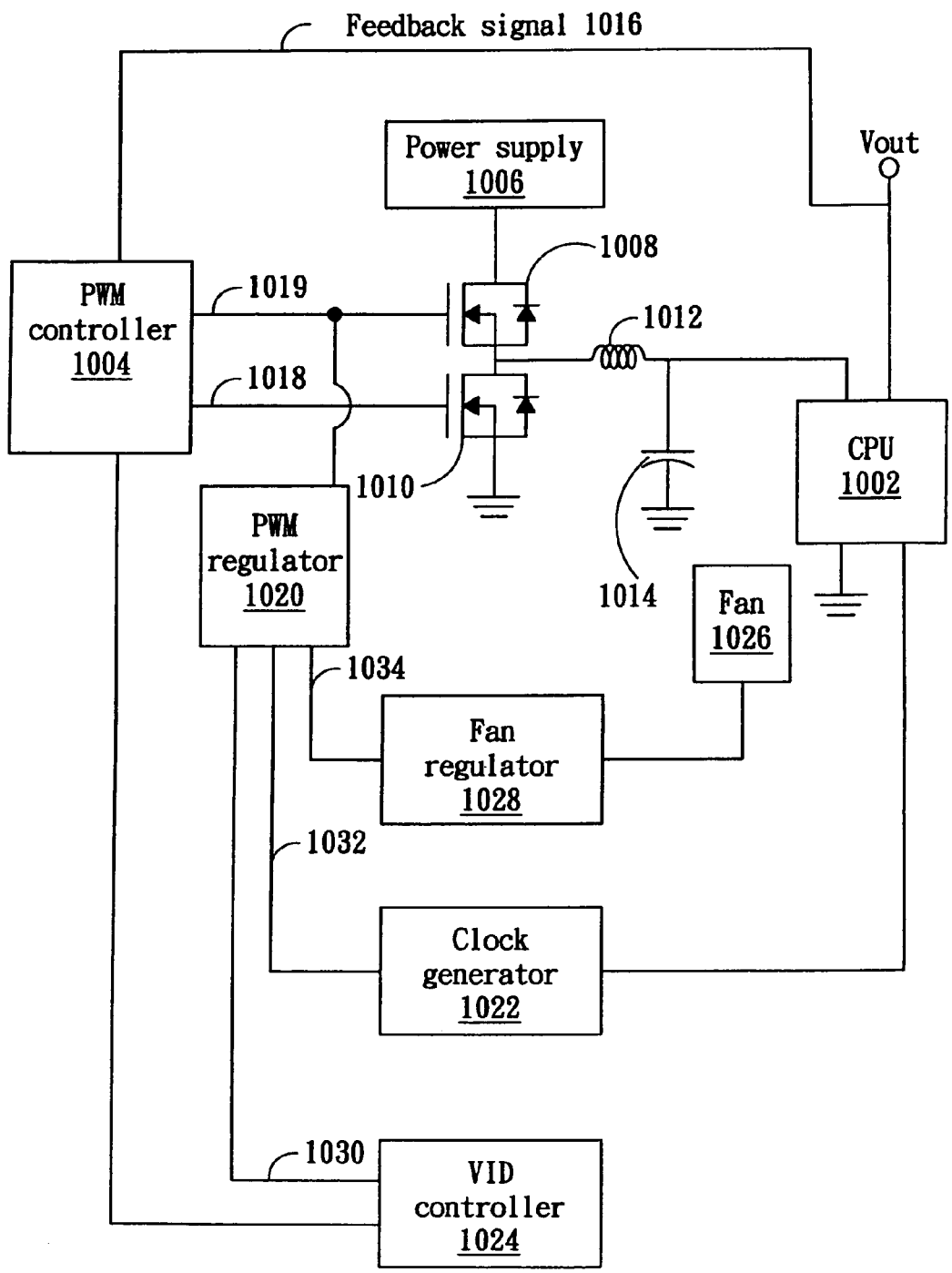
FIG. 10 shows a pulse-width-modulation (PWM) switching regulating circuit according to another embodiment of the present invention.

FIG. 10 shows a pulse-width-modulation (PWM) switching regulating circuit according to another embodiment of the present invention. After assuming the counting period T and the threshold C, a PWM regulator (or recognizer) 1020 receives a periodic control pulse 1019, followed by determining (or detecting) the duty cycle R and comparing the duty cycle R to the threshold C. The PWM regulator 1020 further controls the fan regulator 1028, the clock generator 1022, and the VID controller 1024 via the control signals 1034, 1032, and 1030, respectively. The PWM regulator 1020 could be manufactured as a single integrated circuit chip.

The PWM switching regulating circuit of FIG. 10 includes a PWM controller 1004, which receives the output voltage $V_{out}$ of CPU 1002 and then regulates the supplied voltage to the CPU 1002), a clock generator 1022 for providing clock to the CPU 1002, a VID controller 1024 for providing stable voltage level corresponding to a set of voltage identification codes for the PWM controller 1004, a fan regulator 1028 for controlling the rotational speed of the fan 1026, and the PWM regulator 1020 mentioned above. The PWM regulator 1020 and the fan regulator 1028 could be manufactured as an integrated circuit chip together or individually. Specifically, the PWM regulator 1020, firstly, determines the counting period T, the threshold C, and the sampling time $t_s$. Secondly, the PWM regulator 1020 calculates the (average) duty cycle R, and then compares the duty cycle R to the threshold C. Thirdly, when the duty cycle R is greater/less than the threshold C, the PWM regulator 1020 switches the VID controller 1024 into a high/low power mode, switches the clock generator 1022 into a high/low frequency mode, and switches the fan regulator 1028 into a high/low speed mode.

Figure 11:
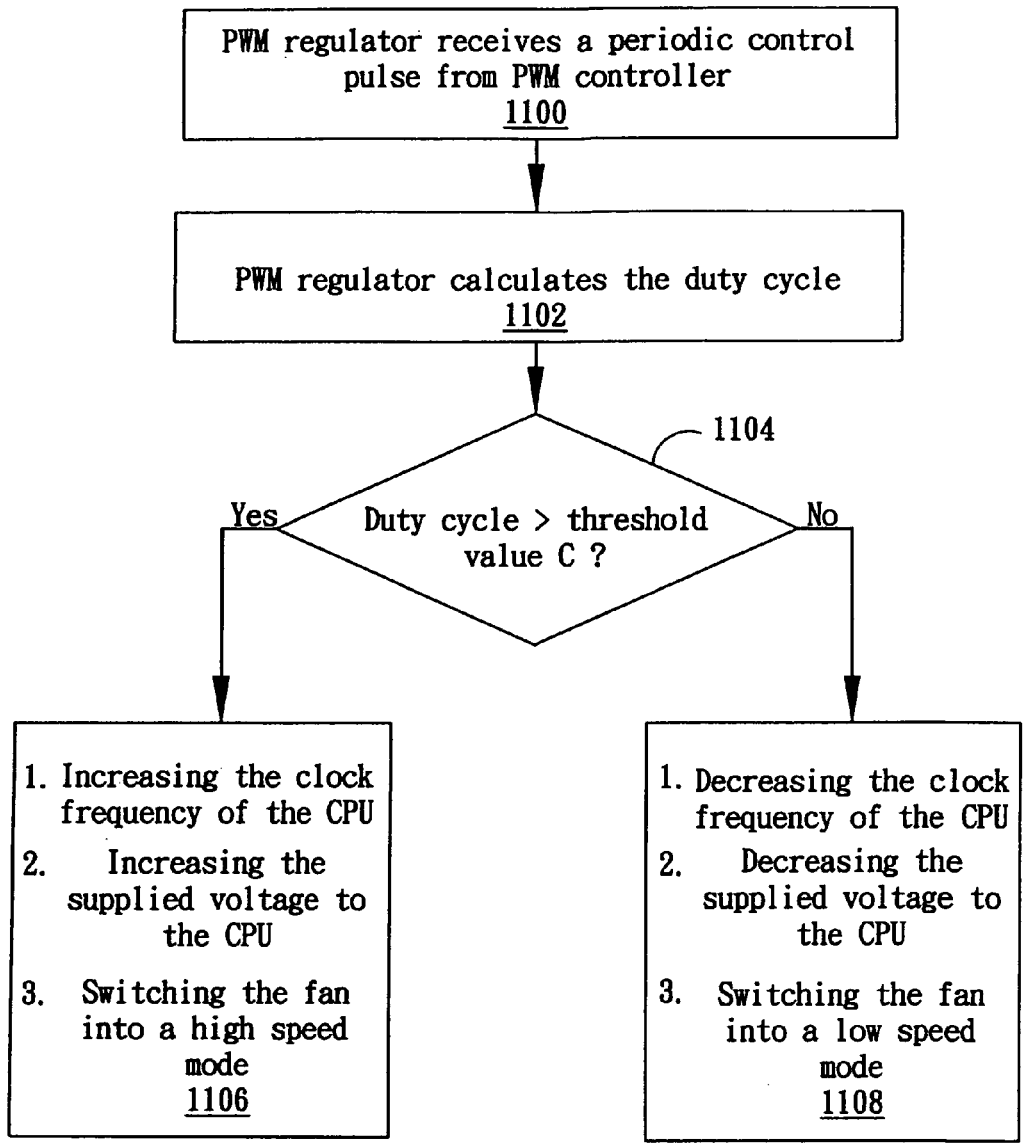
FIG. 11 shows a flow chart of monitoring and adjusting the load of an electronic circuit according to the embodiment of the present invention.

FIG. 11 shows a flow chart of monitoring and adjusting the load of an electronic circuit according to the embodiment of the present invention. Firstly, the PWM regulator 1020 receives a periodic control pulse from the PWM controller 1004 in the step 1100. Thereafter, in the step 1102, the PWM regulator 1020 calculate the (average) duty cycle R based on the assumed counting period T and the sampling time $t_s$, where the duty cycle R is equal to the ratio of the active sampling counts to the total sampling counts. In the step 1104, the PWM regulator 1020 determines whether the duty cycle R is greater than the threshold value C. If the answer is yes, the step 1106 is performed, otherwise the step 1108 is performed. For the step 1106, the PWM regulator 1020 increases the clock frequency of the CPU 1002 through the clock generator 1022, increases the supplied voltage to the CPU 1002 through the VID controller 1024, and switches the fan 1026 into a high speed mode through the fan regulator 1028. For the step 1108, the PWM regulator 1020 decreases the clock frequency of the CPU 1002 through the clock generator 1022, decreases the supplied voltage to the CPU 1002 through the VID controller 1024, and switches the fan 1026 into a low speed mode through the fan regulator 1028.

The present invention provides a system and method for effectively monitoring and adjusting the load of an electronic circuit. The object of the present invention could be accomplished without support from the operating system. Furthermore, the system of the present invention is compatible with conventional circuits, such that the fundamental functions of the original circuits will not be affected when the system of the present invention is not in use or removed.

In the embodiments illustrated above, the duty cycle is compared to the threshold value followed by the two-level control—high level (such as high frequency, high voltage, or high fan spin speed) proceeds if the duty cycle is greater than the threshold; and low level (such as low frequency, low voltage, or low fan spin speed) proceeds if the duty cycle is less than the threshold. It is, however, appreciated that, in other embodiments, the above convention could be conversely defined. For example, while the load current starts to increase, the duty cycle of the periodic control pulse from the PWM controller decreases instead of increasing as in FIG. 3. Accordingly, high level (such as high frequency, high voltage, or high fan spin speed) proceeds if the duty cycle is less than the threshold; and, conversely, low level (such as low frequency, low voltage, or low fan spin speed) proceeds if the duty cycle is greater than the threshold.

Although specific embodiments have been illustrated and described, it will be appreciated by those skilled in the art that various modifications may be made without departing from the scope of the present invention, which is intended to be limited solely by the appended claims.

What is claimed is:

1. A system for regulating a load, comprising:
a pulse-width-modulation (PWM) controller, which generates periodic control pulse having duty cycle varied according to an output of the load; and
a PWM regulator, which monitors a signal characteristic of the periodic control pulse and then regulates at least one working condition of the load according to the signal characteristic.

2. The system according to claim 1, wherein said PWM regulator is configured to calculate the duty cycle of the periodic control pulse and then compare the duty cycle to a predetermined threshold.

3. The system according to claim 2, wherein said working condition comprises clock frequency of the load.

4. The system according to claim 3, further comprising a clock generator for providing clock to the load, wherein said clock generator is controlled under said PWM regulator.

5. The system according to claim 4, wherein said clock generator controllably generates a first clock frequency to the load when the duty cycle of the periodic control pulse is greater than the threshold; and conversely, said clock generator controllably generates a second clock frequency different from the first clock frequency when the duty cycle is less than the threshold.

6. The system according to claim 2, wherein said working condition comprises supplied voltage to the load.

7. The system according to claim 6, further comprising a voltage identification (VID) controller for providing stable voltage level corresponding to a set of voltage identification codes to the PWM controller, wherein said VID controller is controlled under said PWM regulator.

8. The system according to claim 7, wherein said VID controller controls said PWM controller to provide a first supplied voltage to the load when the duty cycle of the periodic control pulse is greater than the threshold; and conversely, said VID controller controls said PWM controller to provide a second supplied voltage different from the first supplied voltage when the duty cycle is less than the threshold.

9. The system according to claim 2, wherein said working condition comprises temperature of the load.

10. The system according to claim 9, further comprising a ran for dissipating heat generated from the load.

11. The system according to claim 10, further comprising a fan regulator for controlling spin speed of the fan, wherein said fan regulator is controlled under said PWM regulator.

12. The system according to claim 11, wherein said fan regulator controllably switches to a first speed mode when the duty cycle of the periodic control pulse is greater than the threshold; and conversely, said fan regulator controllably switches to a second speed mode when the duty cycle is less than the threshold.

13. The system according to claim 12, further comprising a temperature sensor coupled to the load and the fan such that the spin speed of the fan is linearly proportional to sensed temperature of the temperature sensor in either speed mode.

14. A method for regulating a load, comprising:
generating periodic control pulse having duty cycle varied according to an output of the load;
monitoring a signal characteristic of the periodic control pulse; and
regulating at least one working condition of the load based on the signal characteristic of the periodic control pulse.

15. The method according to claim 14, wherein said monitoring step comprises:
calculating the duty cycle of the periodic control pulse; and
comparing the duty cycle to a predetermined threshold.

16. The method according to claim 15, further comprising:
controllably generating a first clock frequency to the load when the duty cycle of the periodic control pulse is greater than the threshold; and
controllably generating a second clock frequency different from the first clock frequency when the duty cycle is less than the threshold.

17. The method according to claim 15, further comprising:
providing a first supplied voltage to the load when the duty cycle of the periodic control pulse is greater than the threshold; and
providing a second supplied voltage different from the first supplied voltage when the duty cycle is less than the threshold.

18. The method according to claim 15, further comprising:
controlling spin speed of a fan to dissipate heat generated from the load.

19. The method according to claim 18, further comprising:
controllably switching the fan to a first speed mode when the duty cycle of the periodic control pulse is greater than the threshold; and
controllably switching the fan to a second speed mode when the duty cycle is less than the threshold.

20. The method according to claim 19, wherein said spin speed of the fan is controlled to be linearly proportional to temperature of the load in either speed mode.

* * * * *